United States Patent
Haah

(10) Patent No.: US 11,568,295 B2
(45) Date of Patent: Jan. 31, 2023

(54) PRODUCT DECOMPOSITION OF PERIODIC FUNCTIONS IN QUANTUM SIGNAL PROCESSING

(71) Applicant: Microsoft Technology Licensing, LLC, Redmond, WA (US)

(72) Inventor: Jeongwan Haah, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 790 days.

(21) Appl. No.: 16/450,653

(22) Filed: Jun. 24, 2019

(65) Prior Publication Data
US 2019/0392343 A1 Dec. 26, 2019

Related U.S. Application Data

(60) Provisional application No. 62/689,675, filed on Jun. 25, 2018.

(51) Int. Cl.
*G06N 10/00* (2022.01)
*G06F 17/12* (2006.01)

(52) U.S. Cl.
CPC ............. *G06N 10/00* (2019.01); *G06F 17/12* (2013.01)

(58) Field of Classification Search
CPC ................................. G06N 10/00; G06F 17/12
See application file for complete search history.

(56) References Cited

U.S. PATENT DOCUMENTS

2014/0187427 A1* 7/2014 Macready ................ G06N 5/02
706/46

OTHER PUBLICATIONS

Haah, "Product Decomposition of Periodic Functions in Quantum Signal Processing," arXiv:1806.10236v2, 20 pp. (Oct. 2018).
Haah et al., "Quantum algorithm for simulating real time evolution of lattice Hamiltonians," arXiv:1801.03922v2, 33 pp. (Apr. 2018).
International Search Report and Written Opinion dated Oct. 1, 2019, from International Patent Application No. PCT/US2019/038758, 17 pp.
Berry et al., "Black-Box Hamiltonian Simulation and Unitary Implementation," *Quantum Information and Computation*, vol. 12, No. 1&2, pp. 29-62 (Jan. 2012).
Berry et al., "Exponential Improvement in Precision for Simulating Sparse Hamiltonians," *Forum of Mathematics, Sigma*, vol. 5, pp. 1-28 (Mar. 2017).

(Continued)

*Primary Examiner* — Jany Richardson
(74) *Attorney, Agent, or Firm* — Klarquist Sparkman, LLP

(57) ABSTRACT

In some embodiments, one or more unitary-valued functions are generated by a classical computer generating using projectors with a predetermined number of significant bits. A quantum computing device is then configured to implement the one or more unitary-valued functions. In further embodiments, a quantum circuit description for implementing quantum signal processing that decomposes complex-valued periodic functions is generated by a classical computer, wherein the generating further includes representing approximate polynomials in a Fourier series with rational coefficients. A quantum computing device is then configured to implement a quantum circuit defined by the quantum circuit description.

20 Claims, 8 Drawing Sheets

(56) References Cited

OTHER PUBLICATIONS

Boyd, "The Rate of Convergence of Fourier Coefficients for Entire Functions of Infinite Order with Application to the Weideman-Cloot Sinh-Mapping for Pseudospectral Computations on an Infinite Interval," *Journal of Computational Physics*, vol. 110, pp. 360-372 (Feb. 1994).

Cheng et al., "Bounding the Sum of Square Roots via Lattice Reduction," *Mathematics of Computation*, vol. 79, No. 270, pp. 1109-1122 (Apr. 2010).

Childs et al., "Hamiltonian Simulation Using Linear Combinations of Unitary Operations," *Quantum Information and Computation*, vol. 12, No. 11&12, pp. 901-924 (Jan. 2012).

Childs, "On the relationship between continuous- and discrete-time quantum walk," *Communications in Mathematical Physics*, vol. 294, Issue 2, pp. 1-22 (Mar. 2010).

Childs et al., "Quantum algorithm for systems of linear equations with exponentially improved dependence on precision," *SIAM Journal of Computing*, pp. 1-31 (2017).

Childs et al., "Toward the first quantum simulation with quantum speedup," *Proc. National Academy of Sciences*, vol. 115, Issue 38, pp. 9456-9461 (Sep. 2018).

Gilyen et al., "Quantum singular value transformation and beyond: exponential improvements for quantum matrix arithmetics," *ACM SIGACT Symp. on Theory of Computing*, pp. 1-67 (Jun. 2018).

Grover, "A fast quantum mechanical algorithm for database search," *ACM Symp. on the Theory of Computing*, pp. 212-219 (1996).

Haah et al., "Quantum algorithm for simulating real time evolution of lattice Hamiltonians," *IEEE Symp. on Foundations of Computer Science*, pp. 350-360 (Oct. 2018).

Harrow et al., "Quantum algorithm for linear systems of equations," *Phys. Rev. Lett.*, vol. 103, pp. 1-24 (Oct. 2009).

Harvey et al., "Faster Integer Multiplication Using Short Lattice Vectors," arXiv:1802.07932v1, pp. 1-16 (Feb. 2018).

Low et al., "Hamiltonian Simulation by Qubitization," *Quantum Physics*, pp. 1-20 (Oct. 2016).

Low et al., "Methodology of Resonant Equiangular Composite Quantum Gates," *Physical Review X*, vol. 6, pp. 1-13 (Dec. 2016).

Low et al., "Optimal Hamiltonian Simulation by Quantum Signal Processing," *Physical Review Letters*, vol. 118, No. 1, pp. 1-5 (Jan. 2017).

Low et al., "The methodology of resonant equiangular composite quantum gates," arXiv:1603.03996v3, pp. 1-13 (Feb. 2018).

Pan, "Optimal and nearly optimal algorithms for approximating polynomial zeros," *Computers & Mathematics with Applications*, vol. 31, No. 12, pp. 97-138 (1996).

Qian et al., "How much precision is needed to compare two sums of square roots of integers?," *Information Processing Letters*, vol. 100, No. 5, pp. 194-198 (Dec. 2006).

Ramos, "Roundoff Error Analysis of the Fast Fourier Transform," *Mathematics of Computation*, vol. 25, No. 116, pp. 757-768 (Oct. 1971).

Schonhage, "On the Power of Random Access Machines," *Int'l Colloquium on Automata, Languages, and Programming*, pp. 520-529 (Jul. 1979).

Shamir, "Factoring Nos. in O(log n) Arithmetic Steps," Massachusetts Inst of Tech Cambridge Lab for Computer Science, 19 pp. (Nov. 1977).

\* cited by examiner

500

By a classical computer, generating one or more unitary-valued functions using projectors with a predetermined number of significant bits - 510

Configuring a quantum computing device to implement the one or more unitary-valued functions - 512

600 

```
By a classical computer, generating a
quantum circuit description for
implementing quantum signal processing
that decomposes complex-valued periodic
functions, wherein the generating further
includes representing approximate
polynomials in a Fourier series with rational
coefficients - 610
```

```
Configuring a quantum computing device to
implement a quantum circuit defined by the
quantum circuit description - 612
```

FIG. 6

By a classical computer, generating a quantum circuit description for implementing quantum signal processing that decomposes complex-valued periodic functions, wherein the generating further includes truncating terms in approximation polynomials with coefficients determined by a preset accuracy parameter - 710

Configuring a quantum computing device to implement a quantum circuit defined by the quantum circuit description - 712

FIG. 7

800 

By a classical computer, generating a quantum circuit description for implementing quantum signal processing that decomposes complex-valued periodic functions, wherein the generating further includes expanding factorized polynomial using discrete fast Fourier transforms - 810

Configuring a quantum computing device to implement a quantum circuit defined by the quantum circuit description - 812

FIG. 8

900 

By a classical computer, generating a quantum circuit description for implementing quantum signal processing that decomposes complex-valued periodic functions, wherein the generating further includes determining complementary polynomials by finding roots of Laurent polynomials to a preset accuracy - 910

Configuring a quantum computing device to implement a quantum circuit defined by the quantum circuit description - 912

FIG. 9

PRODUCT DECOMPOSITION OF PERIODIC FUNCTIONS IN QUANTUM SIGNAL PROCESSING

CROSS-REFERENCE TO RELATED APPLICATIONS

This application claims the benefit of U.S. Provisional Application No. 62/689,675 entitled "PRODUCT DECOMPOSITION OF PERIODIC FUNCTIONS IN QUANTUM SIGNAL PROCESSING" and filed on Jun. 25, 2018, which is hereby incorporated herein by reference in its entirety.

SUMMARY

Here, example algorithms are disclosed to approximate complex-valued periodic functions $f(e^{i\theta})$ as a matrix element of a product of SU(2)-valued functions, and analyze its numerical stability. In this disclosure, it is proven that the algorithm runs in time poly (n log(1/$\epsilon$)) on a Turing machine where n is the degree of the polynomial that approximates $f$ with accuracy $\epsilon$; previous efficiency claim assumed a strong arithmetic model of computation. This product decomposition forms the foundation of embodiments of the quantum signal processing schemes disclosed herein.

In some embodiments, one or more unitary-valued functions are generated by a classical computer generating using projectors with a predetermined number of significant bits. A quantum computing device is configured to implement the one or more unitary-valued functions.

In certain embodiments, a quantum circuit description for implementing quantum signal processing that decomposes complex-valued periodic functions is generated by a classical computer, wherein the generating further includes representing approximate polynomials in a Fourier series with rational coefficients. A quantum computing device is configured to implement a quantum circuit defined by the quantum circuit description.

In particular embodiments, a quantum circuit description for implementing quantum signal processing that decomposes complex-valued periodic functions is generated by a classical computer, wherein the generating further includes truncating terms in approximation polynomials with coefficients determined by a preset accuracy parameter. A quantum computing device is configured to implement a quantum circuit defined by Y the quantum circuit description.

In some embodiments, a quantum circuit description is generated, by a classical computer, for implementing quantum signal processing that decomposes complex-valued periodic functions, wherein the generating further includes expanding factorized polynomial using discrete fast Fourier transforms. A quantum computing device is configured to implement a quantum circuit defined by the quantum circuit description.

In certain embodiments, a quantum circuit description for implementing quantum signal processing that decomposes complex-valued periodic functions is generated by a classical computer, wherein the generating further includes determining complementary polynomials by finding roots of Laurent polynomials to a preset accuracy. A quantum computing device is configured to implement a quantum circuit defined by the quantum circuit description.

Any of the disclosed embodiments can be implemented by one or more computer-readable media storing computer-executable instructions, which when executed by a computer cause the computer to perform any of the disclosed methods. Also disclosed herein are systems for performing embodiments of the disclosed embodiments comprising a classical computer configured to program, control, and/or measure a quantum computing device. The foregoing and other objects, features, and advantages of the disclosed technology will become more apparent from the following detailed description, which proceeds with reference to the accompanying figures.

BRIEF DESCRIPTION OF THE DRAWINGS

FIG. 6 is a flowchart showing another example embodiment for implementing an embodiment of the disclosed technology.

FIG. 7 is a flowchart showing a further example embodiment for implementing an embodiment of the disclosed technology.

FIG. 8 is a flowchart showing another example embodiment for implementing an embodiment of the disclosed technology.

FIG. 9 is a flowchart showing a further example embodiment for implementing an embodiment of the disclosed technology.

DETAILED DESCRIPTION

I. Introduction

Figure 1:
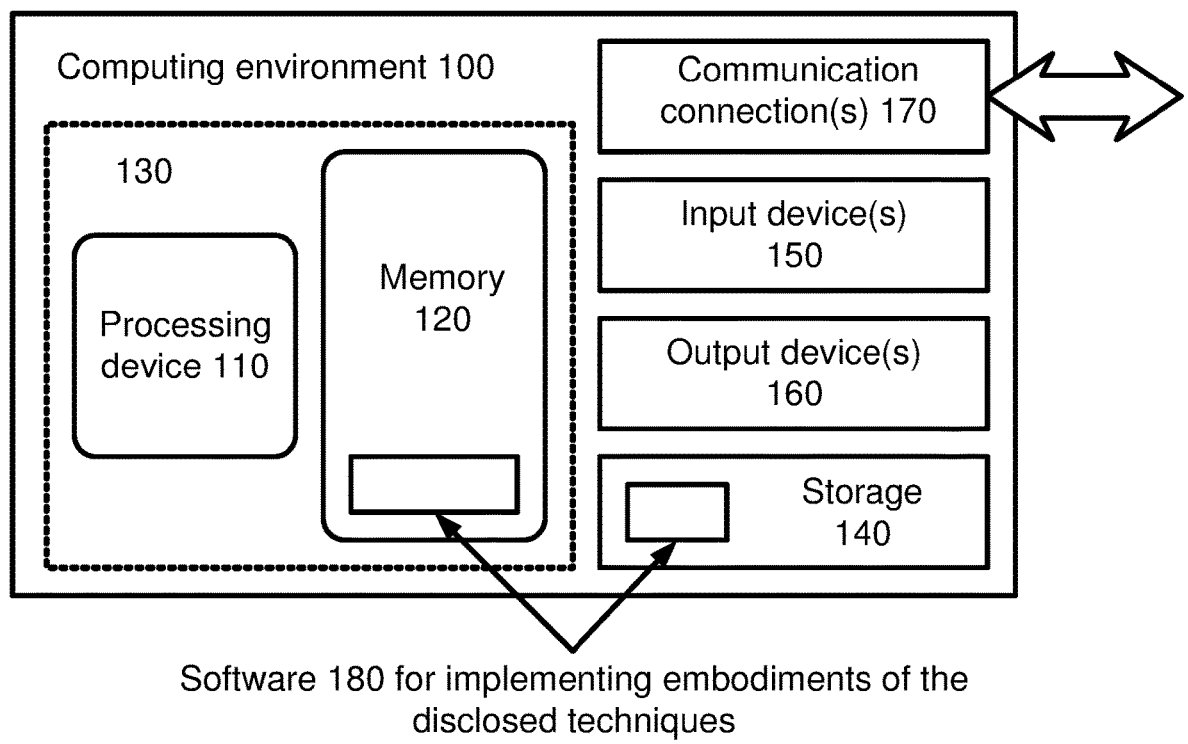
FIG. 1 illustrates a generalized example of a suitable classical computing environment in which several of the described embodiments can be implemented.

Quantum signal processing refers to a scheme to construct an operator V from a more elementary unitary W where $V=\Sigma_\theta f(e^{i\theta})|\theta\rangle\langle\theta|$ and $=e^{i\theta}\rangle\langle\theta|$ share the eigenvectors but the eigenvalues of V are transformed by a function $f$ from those of W. The transformation typically uses only one ancilla qubit, and is achieved by implementing control-W and control-W$^\dagger$, interspersed by single-qubit rotations on the control, and final post-section on the control. This technique produces gate-efficient quantum algorithms for, e.g., Hamiltonian simulations, which is asymptotically optimal when the Hamiltonian is sparse and given as a blackbox, or as a linear combination of oracular unitaries. Furthermore, this technique with rigorous error bounds is useful and competitive, even for explicitly described, rather than oracular, local Hamiltonian simulation problems. It has also been promised for use in solving linear equations.

However, in quantum signal processing the classical preprocessing to find interspersing single-qubit rotations for a given transformation function $f$ has been so numerically unstable, that it is unclear whether it can be performed efficiently. For example, one paper reports that the computation time was "prohibitive" to obtain sequences of length $\geq 30$ of interspersing unitaries for Jacobi-Anger expansions (which is explained later in Section V later). For some cases, the usefulness of the quantum signal processing approach hinges upon the ability to compute long sequences of interspersing single-qubit rotations.

It has been asserted that there exists a polynomial time classical algorithm, but this claim is based on an unusual computational model where any real arithmetic, including evaluation of radicals, trigonometric functions and polynomial root finding, can be performed with arbitrary precision in unit time. Such a computational model is too powerful to be realistic. Allowing arbitrary integer arithmetic at unit cost, one can not only factor integers in time that is linear in the number of digits, but also solve NP-hard problems in polynomial time. The basic idea in Arnold Schoenhage, "On the power of random access machines," in Automata, Languages and Programming, ICALP 1979, Lecture Notes in Computer Science, Vol. 71, edited by Maurer H. A., pp. 520-529 (Springer, Berlin, Heidelberg, 1979) is to relate the expansion of a Boolean formula in a conjunctive form into a disjunctive form with the expansion of a polynomial from its factors. Then, the satisfiability translates to the positiveness of certain coefficients in the expansion. The variable in the polynomial is set to a sufficiently large number, effectively encoding the entire polynomial in a single big number. An important elementary fact that underlies the power of arithmetic model is that one only needs O(n) compositions of squaring operation $x \to x^2$ to reach a $2^n$-grit number. In a seemingly mundane problem involving real numbers, the number of required bits during the computation can be a priori very large. For example, it is still an open problem whether one can decide the larger between $\Sigma_{j=1}^k \sqrt[k]{a_j}$ and $\Sigma_{j=1}^k \sqrt[k]{b_j}$, which are sums of square roots of positive integers $a_j$, $b_j$ that are smaller than n, in time pal i(k log n) on a Turing machine.

The numerical instability of previous methods may be attributed to expansions of large degree polynomials that are found by roots of another polynomial. Crudely speaking, there are two problems in this approach. Fir the polynomial expansions can be regarded as the computation of convolutions, which, when naively iterated, suffers from numerical instability. Second, although the root finding is a well-studies problem, to use the roots to construct another polynomial one has to understand the distribution of the roots to keep track of the loss of precision. These problems were not addressed previously.

Here, numerous refinements are made to the algorithm to find interspersing single-qubit rotations and to bound the number of required bits in the computation for a desired accuracy to a final answer. It can be concluded that the classical preprocessing can indeed be done in polynomial time on a Turing machine. Here, the methods of Guang Han Low, Theodore J. Yoder, and Isaac L. Chuang, "Methodology of resonant equiangular composite quantum gates," Phys. Rev. X 6, 041067 (2016), 1603.03996, are generally adopted, but simplified manipulations are introduced by avoiding trigonometric polynomials. Some generalizations are obtained with simpler calculations. For the numerical stability and analysis, embodiments of the disclosed algorithm avoid too small numbers by sacrificing approximation quality in the initial stage, and replacing polynomial expansions by a Fourier transform. These modifications enable one to handle the problems that are mentioned previously.

One can start by reviewing quantum signal processing in the next section, and then develop an algorithm and analyze it. In two short sections later, a exemplary self-contained treatment of polynomial approximations for Hamiltonian simulation problems and matrix inversion problems is provided. Throughout the disclosure, U(1) is used to denote the group of all complex numbers of unit modulus. Sometimes, reference will be made to U(1) as the unit circle. As usual, $i=\sqrt{-1}$, and X, Y, Z are Pauli matrices.

II. Quantum Signal Processing

To understand how the eigenvalue transformation (signal processing) works, it is convenient to consider the action of control-W restricted to an arbitrary but fixed eigenstate $|\theta\rangle$ of W. The eigenvalue $e^{i\theta}$ associated with $|\theta\rangle$ is kicked back to the control qubit to induce a unitary $|\theta\rangle\langle 0|+e^{i\theta}|1\rangle\langle 1|$ on the control qubit. Conjugating the control-W by a single qubit unitary on the control, one sees that $|0\rangle$ and $|1\rangle$ can be any orthonormal basis vectors $|0'\rangle$, $|1'\rangle$ of the control qubit. If one allow themselves to implement the inverse of the control-. W, which is reasonable, one can also implement $$(|0'\rangle\langle 0'|+e^{i\theta}|1'\rangle\langle 1|)(|0''\rangle\langle 0''|+e^{-i\theta}|1''\rangle\langle 1''|) =$$
$$(e^{-i\theta/2}|0''\rangle\langle 0''|+e^{i\theta/2}|1'\rangle\langle 1'|)(e^{i\theta/2}|0''\rangle$$
$$\langle 0''|+e^{-i\theta/2}|1''\rangle\langle 1''|) \qquad (1)$$

where $\{|0'\rangle, |1'\rangle|1'\rangle\}$ and $\{|0''\rangle,|1''\rangle\}$ are arbitrary orthonormal bases. The square root function $e^{i\theta} \to e^{i\theta/2}$ has a branch cut, but it hardly matters, as long as one is consistent that $e^{-i\theta/2}$ denotes the inverse of the square root. When one can alternate an even number of control-W and control-$W^\dagger$, this approach allows one to assume that an implementable unitary on the control qubit is a product of primitive matrices $$E_P(t) = tP + t^{-1}Q \qquad (2)$$

where $t=e^{i\theta/2}$ and P,Q are projectors of rank 1 that sum to the identity. Thus, an even number n of control-W and control-$W^\dagger$ induces $F(t)=E_{P_1}(t)E_{P_2}(t) \ldots E_{P_n}(t)$ on the control qubit. The product F(t) can be thought of as an SU(2)-valued function over the unit circle in the complex plane. By the same formulas, one can define $E_P(t)$ and F(t) on the entire complex plane except the origin t=0. Now if $\langle +|F(t)|+\rangle$ is close to $f(t^2=e^{i\theta})$ for all $t \in U(1)$, then post-selection on $|+\rangle$ of the control qubit enacts V. Here, the choice of $|+\rangle$ is of course a convention. The success probability of the post-selection, of course, depends on the magnitude of $f(e^{i\theta})$.

A further question is then what F(t) is achievable in the form of $$F(t) = E_0 E_{P_1}(t) E_{P_2}(t) \ldots E_{P_n}(t) \qquad (3)$$

where one can insert an additional single-qubit unitary $E_0$. Since $UE_P(t)U^\dagger = E_{UPU^\dagger}(t)$ for any unitary U, the product F(t) as in Eq. (3) captures any possible action on the control qubit. The answer to the achievability question is shown in the next section.)

III. Polynomial Functions U(1)→Su(2)

Definition 1. For any integer n≥0, let $\mathcal{P}_n$ be the set of all Laurent polynomials $F(t)=\Sigma_{-n \le j \le n} C_j t^j$ in t with coefficients $C_j$ in 2-by-2 complex matrices, such that $F(\eta) \in SU(2)$ for all complex numbers $\eta$ of unit modulus. One can say that its $F(t) \in \mathcal{P}_n$ has degree n if $C_{n0} \ne 0$ or $C_{-n} \ne 0$. One can define $\varepsilon_n$ to be the subset of $\mathcal{P}_n$ comprising F(t) where the exponents of t in F(t) belong to $\{-n, -n+2, -n+4, \ldots, n-2, n\}$. Note that $\mathcal{P}_0 = \varepsilon_0 = SU(2)$, and for any orthogonal projector P one has $E_P(t) \in \varepsilon_1$. One can define $F^\dagger(t)$ to be $\Sigma_j C_j^\dagger t^j$ In a set-theoretic notation, the definitions are as the following.

$$\mathcal{P}_n = \left\{ F(t) = \sum_{j=-n}^{n} C_j t^j \in Mat(2; \mathbb{C})[t, t^{-1}] \middle| \begin{array}{l} \forall_\eta \in \mathbb{C}, \\ \\ |\eta| = 1 \Longrightarrow F(\eta) \in SU(2) \end{array} \right\} \qquad (4)$$

$$\mathcal{E}_n = \left\{ F(t) = \sum_{j=-n}^{n} C_j t^j \in \mathcal{P}_n \,\middle|\, \forall k \in 2\mathbb{Z}+1, C_{-n+k} = 0 \right\} \quad (5)$$

Theorem 2. Any n-fold product $E_{P_1}(t) \ldots E_{P_n}(t)$ belongs to $\varepsilon_n$. Conversely, every $F(t) \in \varepsilon_n$ of degree n has a unique decomposition into primitive matrices and a unitary, as in Eq. (3).

This completely characterizes polynomial functions $U(1) \to SU(2)$ and covers all previous results on "achievable function functions" in quantum signal processing. Embodiments of the disclosed technology are slightly more general since previous results assume that $Tr(P_j Z) = 0$.

Proof. The first statement is trivia definition. The proof of the converse is induction in n where the base case n=0 is trivial. The induction step is proved as follows. Here, it will be proven that hr any $F(t) \in \varepsilon_n$ of degree n>0 there exists a $E_P(t)$ such that $F(t) E_P(t) \in \varepsilon_{n-1}$. One might find it unusual that degree of a polynomial is decreasing under multiplication, but in the algebra of matrices two nonzero matrices may multiply to vanish. Such $E_P(t)$ is unique since $F^\dagger(1/t) F(t) = I = E_P^\dagger(1/t) F^\dagger(1/t) F(t) E'_P(t)$ for two possible $E_P(t)$ and $E'_P(t)$. Also, the product $F(t) E_P(t)$ must have degree n-1; otherwise $F(t)$ would have degree less than n.

The existence of the $E_P$ will now be shown. Consider $F(t) = \sum_{j=-n}^{n} C_j t^j$ as a 2-by-2 matrix of four Laurent polynomials. The defining property det $F(t) = 1$ holds for infinitely many values of t, and therefore it should hold as a polynomial equation. Taking the leading term, one has $t^{2n}$ det $C_n$+(lower order terms)=1. Similarly, taking the leading term in $t^{-1}$, one has $t^{-2n}$ det $C_{-n}$+(higher order terms)=1. Hence, $$\det C_n = 0 = \det C_{-n}.$$

Similarly, from the equation $F^\dagger(1/t) F(t) = I = F(t) F^\dagger(1/t)$ one has $t^{2n} C_{-n}^\dagger C_n + \mathcal{O}(t^{2n-1}) = I = t^{2n} C_n C_{-n}^\dagger + \mathcal{O}(t^{2n-1})$ and hence $$C_{-n}^\dagger C_n = 0 = C_n C_{-n}^\dagger \quad (7)$$

Suppose $C_n \neq 0$. Let P be a rank-1 projector such that $C_n P = 0$, and let $Q = I - P$. Such P is unique since C is a two-by-two matrix of rank one. Then, a claim is made that $F(t)(tP + t^{-1} Q) \in \varepsilon_{n-1}$. Indeed, expanding the left-hand side one has $$t^{-n-1} C_{-n} Q + t^{-n+1}(C_{-n} P + C_{-n+2} Q) + \ldots + t^{n-1}(C_n Q + C_{n-2} P) + t^{n+1} C_n P. \quad (8)$$

(This is the only place one uses $\varepsilon$ instead of $\mathcal{P}$.) If $C_{-n} = 0$, this implies the claim. If $C_{-n} \neq 0$, then $P \propto C_{-n}^\dagger C_{-n}$ and therefore $C_{-n} Q = 0$, implying the claim. The case $C_{-n} \neq 0$ is completely parallel. (Actually, $C_{-n} \neq 0$ if $C_n \neq 0$ as one will see later.) □

A. Parity Constraints

Recall that under the standard representation of Pauli matrices, Z is diagonal, and X,Y are off-diagonal. Suppose an SU(2)-valued function $\theta \to F(e^{i\theta}) = a(e^{i\theta}) I + b(e^{i\theta}) iX + c(e^{i\theta}) iY + d(e^{i\theta}) iZ$ has even functions (reciprocal in $t = e^{i\theta}$) in the diagonal and odd (anti-reciprocal in $t = e^{i\theta}$) in the off-diagonal. It is claimed that if $F(t)$ is an element of $\varepsilon_n$ then the primitive matrix $E_{P_n}(t)$ factored from $F(t)$ by Theorem 2 has a property that $Tr(ZP_n) = 0$. This implies $E_{P_n}(t)$ has reciprocal diagonal and an i-reciprocal off-diagonal. To prove the claim, once can observe that $$Z = F(t) F^\dagger(1/t) Z \quad (9)$$

$$= F(t)(a(1/t) - b(1/t) iX - c(1/t) iY - d(1/t) iZ) Z$$

$$= F(t)(a(t) + b(1/t) iX + c(t) iY - d(t) iZ) Z$$

$$= F(t) Z(a(t) - b(t) iX - c(t) iY - d(t) iZ)$$

$$= F(t) Z F^\dagger(t).$$

It follows that $0 = Tr(Z) = Tr(F(t) Z F^\dagger(t)) = t^{2n} Tr(C_n Z C_n^\dagger) + \ldots + t^{-2n} Tr(C_{-n} Z C_{-n}^\dagger)$ as a polynomial in t, and hence $Tr(C_n^\dagger C_n Z) = 0 = Tr(C_{-n}^\dagger C_{-n} Z)$ when u>0. The matrix $C_{\pm n}^\dagger C_{\pm n}$ is proportional to the projector $P_n$ up to the identity in the construction of the factor $E_{P_n}$ Theorem 2, and therefore one has $Tr(ZP_n) = 0$.

Moreover, it then follows that $F(t) E_{P_n}^\dagger(1/t)$ has reciprocal diagonal and anti-reciprocal off-diagonals. Therefore, the unique projectors $P_1, \ldots, P_n$ in the decomposition, which defines the primitive matrices $E_{P_j}(t)$, have zero Z-component. This means that all projectors $P_j$ are of form $$P_j = e^{iZ\phi_j/2} |+\rangle \langle + | e^{-iZ\phi_j/2} \quad (10)$$

where $\phi_j \in \mathbb{R}$ is some angle. In fact, Guang Hao Low, Theodore J. Yoder, and Isaac L. Chuang, "Methodology of resonant equiangular composite quantum gates," Phys. Rev. X 6, 041067 (2016), 160103996 exclusively considered $E_P(t)$ of this form. This is contrasted to the general case where $P_j$ is identified with a point on the Bloch sphere.

Note that $E_0$, the residual SU(2) factor in the decomposition, has generally nonzero Z-component. Since $E_P(1) = I$ for any projector P, one knows that $E_0 = F(1) = a(1) I + b(1) iX + c(1) iY + d(1) iZ$, but $b(1) = c(1) = 0$ due to their anti-reciprocity. This implies that $E_0 = e^{iZ\phi_0/2}$ for some angle $\phi_0$. Hence, under the parity constraint of this subsection, $F(t) \in \varepsilon_n$ is uniquely specified by n+1 angles $\phi_0, \phi_1, \ldots, \phi_n$. Note that if $d(1)^2 = 1 - a(1)^2 = \mathcal{O}(\epsilon)$, then $d(1) = \mathcal{O}(\sqrt{\epsilon})$ and $\|E_0 - I\| = \mathcal{O}(\sqrt{\epsilon})$.

B. Complementing Polynomials

Quantum signal processing does not use $F(t)$ itself, but rather a certain matrix element of it. Hence, it is important to know what a matrix element can be. Observe that any member of SU(2) can be written as $aI + biX + ciY + diZ$ where the real numbers a, b, c, d satisfy $a^2 + b^2 + c^2 + d^2 = 1$, and this decomposition is unique. (The group SU(2) is identified with the group of all unit quaternions.) Thus, a member $F(z) \in \mathcal{P}$ can be written uniquely as $F(z) = a(z) I + b(z) iX + c(z) iY + d(z) iZ$. Here, $a(z), b(z), c(z), d(z)$ are Laurent polynomials such that $a(z)^2 + b(z)^2 + c(z)^2 + d(z)^2 = 1$, and each takes real values on U(1).

Definition 3. A (Laurent) polynomial with real $\mathbb{R}$ coefficients is called a real (Laurent) polynomial. The degree of a Laurent polynomial is the maximum absolute value of the exponent of the variable whose coefficient is nonzero. A Laurent polynomial $f(z)$ is reciprocal if $f(z) = f(1/z)$, or anti-reciprocal if $f(z) = -f(1/z)$. A Laurent polynomial function $f: \mathbb{C}^\times \to \mathbb{C}$ is real-on-circle if $f(z) \in \mathbb{R}$ for all $z \in \mathbb{C}$ of unit modulus. A real-on-circle Laurent polynomial $f(z)$ is pure if $f(z)$ is real reciprocal or if $f(z)$ is real anti-reciprocal.

The term "pure" is used because a Laurent polynomial $f(z)$ with complex coefficients is real-on-circle if and only if $$f_+(z) := \frac{f(z) + f(1/z)}{2} \text{ and } f_-(z) := \frac{f(z) - f(1/z)}{2i} \quad (11)$$

are real Laurent polynomials. (Proof: Write $f(e^{i\theta})=\Sigma_j a_j e^{ij\theta}$, with the complex conjugate being $\Sigma_j \overline{a_j} e^{-ij\theta} = \Sigma_j \overline{a_{-j}} e^{ij\theta}$. Thus, $a_j = \overline{a_{-j}}$, and the claim follows.) This simply rephrases the fact that a real-valued function $\theta \to f(e^{i\theta})$ has a trigonometric function series with real coefficients. Hence, for any real-on-circle Laurent polynomial $f(z)$, it is real if and only if it is reciprocal. In addition, a real and reciprocal Laurent polynomial is real-on-circle. That is, among the three properties, real, real-on-circle, and reciprocal, any two imply the third. Note that a real-on-circle Laurent polynomial is not necessarily real, and a real Laurent polynomial is not necessarily real-on-circle. Also, note that real-on-circle Laurent polynomials form an algebra over $\mathbb{R}$.

One is now ready to state a sufficient con, r under which a complex polynomial qualifies to be a matrix element of some $F(t) \in \mathcal{P}_n$. One can think of $a(z)$ and $b(z)$ below as the real and imaginary part of a complex function, respectively.

Lemma 4. Let $a(z)$ and $b(z)$ be real-on-circle Laurent polynomials of degree at most n such that $a(\eta)^2 + b(\eta)^2 \leq 1$ for all $\eta \in U(1)$. If $a(z)^2 + b(z)^2$ is reciprocal (e.g., $a(z)$ and $b(z)$ are pure), then there exist pure real-on-circle Laurent polynomials $c(z) = c_+(z)$ and $d(z) = id_-(z)$ of degree at most n such that $a(z)^2 + b(z)^2 + c(z)^2 + d(z)^2 = 1$.

Note that if $a(z)$ is pure and $a(z)^2 + b(Z)^2$ is reciprocal, then $b(z)$ is also pure. (Proof: $b(z)^2 = (b_+(z) + ib_-(z))^2 = (z)b_+(z)^2 - b_-(z)^2 + 2ib_+(z)b_-(z)$ has to be real.)

Proof. The Laurent polynomial $1 - a(z)^2 - b(z)^2$ is reciprocal real of degree n' that is at most 2n; the leading terms of $a(z)^2$ and $b(z)^2$ might cancel each other so that n'<2n. Due to the reciprocity, any real root r comes in a pair (r, 1/r) where $r \neq \pm 1$ since no root exists on U(1). For the same reason, any nonreal complex root z comes in a quadruple $(z, \bar{z}, 1/z, 1/\bar{z})$, and there is no degenerate quadruple. Enumerate representatives of the pairs and quadruples of the roots:

$$\mathcal{C} = [r \in \mathbb{C} : 1 - a(r)^2 - b(r)^2 = 0, \Im(r) > 0, |r| < 1], \quad (12)$$

$$\mathcal{R} = [r \in \mathbb{R} : 1 - a(r)^2 - b(r)^2 = 0, |r| < 1]. \quad (13)$$

These are lists rather than sets, as one takes the multiplicities into account. So, $4|\mathcal{C}| + 2|\mathcal{R}| = 2n'$. (A reciprocal Laurent polynomial of degree n' has 2n'' roots.) If n' is even, let $\mathcal{R} = \mathcal{R}_1 \sqcup \mathcal{R}_2$ be a partition into sublists of equal lengths; if n' is odd, let $\mathcal{R} = \mathcal{R}_1 \sqcup \mathcal{R}_2$ be a partition into sublists of lengths differing by one. Consider factors of $1 - a(z)^2 - b(z)^2$:

$$e(z) = \prod \left(z - 2\Re(r) + \frac{|r|^2}{z}\right) \cdot \prod (z - r_1) \cdot \prod \left(\frac{1}{z} - r_2\right). \quad (14)$$

$$\text{or } = z^{-\lfloor n'/2 \rfloor} \prod (z - a) \quad (15)$$

The factor $e(z)$ is a real Laurent polynomial of degree $\lceil n'/2 \rceil$. Then, the product $e(z)e(1/z)$ is real reciprocal and has degree $2|\mathcal{C}| + |\mathcal{R}_1| + |\mathcal{R}_2| = n'$. The degree of a Laurent polynomial in the definition is only subadditive under multiplication of two Laurent polynomials. For example, the product $(z-1)(z^{-1}-2)$ has degree one. Now the two Laurent polynomials $e(z)e(1/z)$ and $1 - a(z)^2 - b(z)^2$ are reciprocal real, and have the same roots, and therefore they differ by a constant factor $$\alpha = \frac{1 - a(z)^2 - b(z)^2}{e(z)e(1/z)} \in \mathbb{R}.$$

Evaluating this expression at z=1, one sees that α is positive. Thus, one finishes the proof by observing $$1 - a(z)^2 - b(z)^2 = \quad (16)$$

$$\alpha e(z)e(1/z) = \left(\frac{e(z) + e(1/z)}{2}\sqrt{\alpha}\right)^2 + \left(\frac{e(z) - e(1/z)}{2i}\sqrt{\alpha}\right)^2.$$

Both the reciprocal (c(z)) and anti-reciprocal (d(z)) combinations have degree $\leq \lceil n'/2 \rceil \leq n$. □

As one can see in the proof, given $a(z)$ and $b(z)$, the "remainder" Laurent polynomials $c(z)$, $d(z)$ are not unique. At least, the partition $\mathcal{R}_1 \sqcup \mathcal{R}_2$ is arbitrary.

IV. Efficient Implementation with Bounded Precision

In this section, an example algorithm is considered to find interspersing single-qubit unitaries given a complex function $A(\varphi) + iB(\varphi)$. The example algorithm, in this embodiment, comprises two main parts: first, one finds a SU(2)-valued function of $\varphi$ such that a particular matrix element is the input function. It suffices to find a good approximation. Second, one has to decompose the SU(2)-valued function into a product of primitive matrices. Constructive proofs for both the steps have already been given, but the construction can be tailored so that numerical error is reduced and traceable. An example algorithm is outlined first, deferring certain details to the next subsection. The computational complexity will be analyzed subsequently.

A. Algorithm

0. An input is a complex-valued periodic function $A(\varphi) + iB(\varphi)$ with period $2\pi$ where A and B are real-valued, such that $A(\varphi)^2 + B(\varphi)^2$ is an even function of $\varphi$ and is $\leq 1$ for any real $\varphi$. Given $\epsilon > 0$, the order of error that is tolerated, analyze $A(\varphi)$, $B(\varphi)$ to obtain $\epsilon$-close real-on-circle Laurent polynomials $\tilde{A}(z)$, $\tilde{B}(z)$ for $z = e^{i\varphi}$.
1. Compute rational Laurent polynomials $a(z)$ and $b(z)$ of degree m such that (i) $a(z)^2 + b(z)^2$ is real reciprocal (ii) they are $6\epsilon$-close to the true target functions on U(1), (iii) $a(z)^2 + b(z)^2 \leq 1 - \epsilon$ for $z \in U(1)$, and (iv) every coefficient in $a(z)$ or $b(z)$ has magnitude $\geq \epsilon/n$.
2. Find all roots of $1 - a(z)^2 - b(z)^2$ to accuracy $2^{-R}$ where $R = \Omega(n \log(n/\epsilon))$
3. Evaluate the complementary polynomials computed from the roots of 2 according to Lemma 4 at points of T where $$T := \{e^{2\pi i k/D} | k = 1, \ldots, D\}$$

and D is a power of 2 that is larger than 2n+1. One should not expand c(z), d(z) before evaluation, but should substitute numerical values for z with accuracy $2^{-R}$ in the factorized form of e(z), and then read off the real (c(z)) and imaginary (d(z)) parts.
4. Compute the fast Fourier transform of the function value list to obtain $$C_{2j}^{(2n)} = \int_0^{2\pi} \frac{d\theta}{2\pi} e^{-ij\theta} F(e^{i\theta}) \quad (18)$$

for $j = -n, -n+1, \ldots, n-1, n$. (In exact arithmetic, one would have $F(z) = \Sigma_{j=31}^{n} {}_nC_{2j}^{(2n)} z^j$.)

5. For m=2n, 2n−1, . . . , 2, 1 sequentially in decreasing order, (i) obtain a primitive matrix $E^{(m)}(t)$ by $$E^{(m)}(t) = t(I - Q^{(m)}) + t^{-1}Q^{(m)} = tP^{(m)} + t^{-1}(I - P^{(m)}) \quad (19)$$

where $Q^{(m)} = \frac{C_m^{(m)\dagger} C_m^{(m)}}{\|C_m^{(m)\dagger} C_m^{(m)}\|}$, $P^{(m)} = \frac{C_{-m}^{(m)\dagger} C_{-m}^{(m)}}{\|C_{-m}^{(m)\dagger} C_{-m}^{(m)}\|}$, and (ii) compute the coefficient list of $F^{(m-1)}(t) = F^{(m)}(t) E^{(m)}(t)$ by $$C_k^{(m-1)} = C_{k-1}^{(m)} P^{(m)} + C_{k+1}^{(m)} Q^{(m)} \quad (20)$$

where k=−m+1, −m+3, . . . , m−3, m−1.

6. Output $E^{(2n)}(t), \ldots, E^{(1)}(t)$ and $E^{(0)} = C_0^{(0)}$ Then, $\langle +|E^{(0)}E^{(1)\dagger}(1/t) \ldots E^{(2n)\dagger}(1/t)|+\rangle$ is $\mathcal{O}(\epsilon)$-close to $A(t^2) + iB(t^2)$ for all $t \in U(1)$.

B. Further Details and Analysis

Step 0. The complexity of this Step depends on the nature of the true target functions A(z) and B(z); the smoother the functions are, the lower the complexity is. An obvious approach is to expand the given function in Fourier series and truncate it at a certain degree to desired accuracy. See Sections V and VI for examples.

Step 1. Put $\tilde{a}(z) = (1-2\epsilon)\tilde{A}(z) = \sum_{k \in \mathbb{Z}} \tilde{a}_k z^k$ and $\tilde{b}(z) = (1-2\epsilon)\tilde{B}(z) = \sum_{k \in \mathbb{Z}} \tilde{b}_k z^k$, where only finitely many $\tilde{a}_k, \tilde{b}_k$ are nonzero. Let n be the largest positive integer such that at least one of $|\tilde{a}_n|, |\tilde{a}_{-n}|, |\tilde{b}_n|, |\tilde{b}_{-n}|$ is $\geq \epsilon/n$.

Approximate every coefficient of $\tilde{a}(z)$ and $\tilde{b}(z)$ by rational numbers up to error $\epsilon/n$ to obtain a(z) and b(z); this can be done by continued fractions. The rational approximation should preserve reality and (anti-)reciprocity if exists. Any coefficient that are smaller than $\epsilon/n$ is made zero by the rational approximation. By the choice of r, the degrees of a(z) and b(z) are at most n, and one of them is indeed n. Then, one can easily show that a(z) and b(z) satisfies all four conditions. The number of bits to represent all the rational coefficients is $\mathcal{O}(n \log(n/\epsilon))$.

The reason to use rational Laurent polynomials is mainly for the convenience of analysis, as its evaluation can be made arbitrarily accurate and one does not need to worry about the precision of the coefficients of a(z) and b(z).

Step 2. There exists a root-finding algorithm with computational complexity $\tilde{\mathcal{O}}(n^3 + n^2 R)$ under the assumption that all the roots have modulus at most 1. In this case, the rational Laurent polynomial $p(z) = 1 - a(z)^2 - b(z)^2$ does not satisfy the modulus condition; however, this is a minor problem. Every coefficient of p(z) is the Fourier coefficient of the periodic function $p(e^{i\theta}) < 1$, and hence is bounded by 1. By the condition (iv) of Step 1, the leading coefficient of p(z) is at least $(\epsilon/n)^2$ in magnitude. (The leading coefficients of a(z) and b(z) may cancel each other in p(z), yielding a much smaller leading coefficient in p(z), but some arbitrary perturbation of magnitude $\epsilon/n$ in the rational approximation can easily remove such fine-tuned cancellation. Consequently, one may assume that p(z) has degree 2n.) Converting p(z) into a monic polynomial q(z) (after multiplying $z^{2n}$), one has $q(z) = z^{4n} + \sum_{j=0}^{4n-1} q_j z^j$ with $|q_j| \leq (n/\epsilon)^2$. If $q(z_0) = 0$ with $|z_0| > 1$, then $$|z_0|^{4n} \leq \sum_{j=0}^{4n-1} |q_j||z_0|^j \leq O(n^3 |z_0|^{4n-1}/\epsilon^2) \quad (21)$$

implying $|z_0| \leq \mathcal{O}(n^3/\epsilon^2)$. (If $|z_0| \leq 1$, this is trivial.) One can use the algorithm of V. Y. Pan, "Optimal and nearly optimal algorithms for approximating polynomial zeros," Computers & Mathematics with Applications 31, 97 138 (1996), after rescaling z by a known factor. The loss of accuracy due to the rescaling is negligible since $R = \Omega(n \log(n/\epsilon))$.

Step 3. One desirably evaluates e(s) that is defined by roots found in Step 2. For $z \in U(1)$, the following Lemma 5 guarantees that any root of $1 - a(z)^2 - b(z)^2$ is $\Omega(\epsilon/n)$-away (or $\Omega(1/n)$-away if $|1 - A(z)^2 - B(z)^2| = \mathcal{O}(\epsilon)$) from the unit circle. The number of significant bits that are lost is at most $\mathcal{O}(\log(n/\epsilon))$, which is negligible compared to R.

Lemma 5. If a Laurent polynomial $f(z)$ of degree d is such that $0 < m \leq f(z) \leq M$ for all $z \in U(1)$, then every zero of $f$ is at least m/(6Md)-away from U(1).

Proof. Pick any root $z_0$ and choose the closest point $u \in U(1)$ so that $f(z_0 = u + \eta) = 0$. One will lower bound the magnitude of $\eta$. Assure $$|\eta| < \frac{m}{6Md}$$

on the contrary to the claim; in particular, $|\eta| < 1/(2d)$. Since $f$ is analytic except at z=0, the Taylor series of $f$ at u converges at $z = u + \eta$.

$$0 = f(u + \eta) = \sum_{k \geq 0} \frac{f^{(k)}(u)}{k!} \eta^k. \quad (22)$$

Let one estimate the magnitude of derivatives at u. Observe that $f^{(k)}(u) = (e^{-i\theta} \partial_\theta)^k f(e^{i\theta})$. Also, observe that $f(e^{i\theta}) = \sum_{j=-d}^{d} a_j e^{ij\theta}$ where $a_j = (2\pi) \int_0^{2\pi} d\theta f(e^{i\theta}) e^{-ij\theta}$. Hence, $|a_j| \leq M$ and thus $|f^{(k)}(u)| \leq 2d \cdot M \cdot d(d+1) \ldots (d+k-1)$; there are 2d terms and the maximum absolute value of the exponent increases by at most 1 every time one differentiates due to the negative degree term. Therefore, $$m \leq |f(u)| \leq \sum_{k \geq 1} 2dM \binom{d+k-1}{k} |\eta|^k = \quad (23)$$

$$2dM \left(\frac{1}{(1-|\eta|)^d} - 1\right) \leq 2dM \cdot 3|\eta|$$

where in the last inequality one can use the hypothesis that $|\eta| < 1/(2d)$. □

Step 4. This is essentially expanding the polynomials c(z) and d(z) found in the root finding step, but one can use the fast Fourier transform (FFT) for its better accuracy. It has been shown that the FFT on an N-component input F where each component is accurate to (relative) error $\delta$ gives Fourier coefficients $\tilde{F}_\omega$ with error $$\max_\omega \left|\tilde{F}_\omega - \hat{F}_\omega\right| \leq O(\sqrt{N} \log N) \cdot \delta \sqrt{\frac{1}{N} \sum_\omega |\hat{F}_\omega|^2} \quad (24)$$

where $\hat{F}$ is the true Fourier spectrum. Since the input "vector" F in this Step is a list of unitary matrices, the root-mean-square factor is $\mathcal{O}(1)$, and the distinction between relative and absolute error is immaterial. By the analysis of Step 3 above, $\delta$ is $2^{-R+\mathcal{O}(\log(n/\epsilon))}$. Thus, the error in any Fourier coefficient $C_{2k}^{(2n)}$ is $\delta_{2n} = \mathcal{O}(\delta\sqrt{n}\log n)$.

Step 5. This is an implementation of Theorem 2. One desirably bounds the error propagated through the loop over m. The error in $E^{(m)}(t)$ is of the same order as the error of $Q^{(m)}$ or $P^{(m)}$. Thanks to the condition (iv) of Step 1, $$\|C_{\pm m}^{(m)}\| \geq \|C_{\pm 2}^{(2n)}\| \geq \epsilon/n, \quad (25)$$

(where the first inequality is because $C_{\pm m}^{(m)}$ is a product of one unitary and m projectors for any $m \geq 0$) and the error in $Q^{(m)}$ or $P^{(m)}$ is at most $\mathcal{O}(\delta_m n/\epsilon)$. Since the projectors $P^{(m)}$ $Q^{(m)}$ or the Fourier coefficients $C_k^{(m)}$ of a unitary-valued function has norm at most 1, one sees that $$\delta_{m-1} \leq \mathcal{O}(\delta_m n/\epsilon). \quad (26)$$

Summarizing, $$\log_2(1/\delta_{2n}) = R - \mathcal{O}(\log(n/\epsilon)), \quad (27)$$

$$\log_2(1/\delta_{m-1}) \geq \log_2(1/\delta_m) - \mathcal{O}(\log(n/\epsilon)), \quad (28)$$

$$\log_2(1/\delta_0) \geq R - \mathcal{O}(n \log(n/\epsilon)). \quad (29)$$

Since one wants $\delta_0$ to be sufficiently smaller than $\epsilon/n$, it suffices to have $R = \Omega(n \log(n/\epsilon))$.

Step 6. The correctness of the algorithm is clear from the construction and error analysis above.

C. Computational Complexity

All arithmetic in the algorithm above operates with at most R-bit numbers, where R is chosen to be $\Theta(n \log(n/\epsilon))$. The number of elementary bit operations (AND, OR, NOT) to perform one basic arithmetic operation ($+, -, \times, /$) on u-bit numbers is upper bounded by $\mathcal{O}(u\, \text{polylog}(u))$. Let one count the number of arithmetic operations. Assuming that the coefficients of the true function $A(z)$ and $B(z)$ are given to accuracy $\mathcal{O}(\epsilon/n)$, it takes $\mathcal{O}(n \log(n/\epsilon))$ arithmetic operations to find rational approximations, since continued fraction converges exponentially. The root finding takes time $\mathcal{O}(n^3 - n^2 R) = \mathcal{O}(n^3 \log(n/\epsilon))$; this count includes all the cost of bit operations for high precision arithmetic. The polynomial function evaluation involves $\mathcal{O}(n)$ arithmetic operations. The FFT requires $\mathcal{O}(n \log n)$ operations given $\mathcal{O}(\log n)$ trigonometric function values, which can be computed by Taylor expansions of order R, invoking $\mathcal{O}(R \log n)$ arithmetic operations. These result in arithmetic complexity $\mathcal{O}(n \log(n) \log(n/\epsilon))$ for the FFT. Updating the Fourier coefficient list $C_k^{(m)}$ involves $\mathcal{O}(n)$ arithmetic operations, which one can do for $\mathcal{O}(n)$ times, resulting in $\mathcal{O}(n^2)$ arithmetic operations. Overall, the computational complexity for any constant $\epsilon$ is $\mathcal{O}(n^3\, \text{polylog}(n))$.

V. Application to Hamiltonian Simulation

Suppose one is given a unitary W whose eigenvalues $\mp e^{\pm i\theta_\lambda}$ are associated with those $\lambda$ of a Hermitian matrix H with $\|H\| \leq 1$ as $$\sin \theta_\lambda = \lambda. \quad (30)$$

The correspondence between W and H might seem contrived at this stage, but when H is represented as a linear combination of unitaries, it is possible to construct such W as a quantum circuit. The relation of Eq. (30) is in fact common whenever quantum walk is used. (See Section IX for some detail.) So, the desired transformation is $$e^{i\theta_\lambda} \to e^{-i\tau \sin \theta_\lambda} \approx \langle + | F(e^{i\theta_\lambda/2}) | + \rangle \quad (31)$$

where $F(t)$ should be constructed by quantum signal processing. Since the product of n primitive matrices yields a Fourier component of frequency at most $n/2$, $F(t)$ comprises, in some embodiments, of at least $2\tau$ factors. (The factor of 2 is due to the half-angle in the argument of F.) Note that the success probability of the post-selection is close to 1 since $|f(e^{i\theta_\lambda})| = 1$.

With $e^{i\varphi} = z$, one can write $$\exp(i\tau \sin\varphi) = \exp\left(\tau \frac{z - z^{-1}}{2}\right) = \sum_{k \in \mathbb{Z}} J_k(\tau) z^k \quad (32)$$

where $J_k$ are the Bessel functions of the first kind. This is the Fourier series of $\exp(i\tau \sin \varphi)$, and one can see that $J_k$ is an even function if k is even, and odd if k is odd. Also, $J_{-k} = (-1)^k J_k$. One can take Eq. (32) as a definition of the Bessel functions. One can separate the reciprocal and anti-reciprocal parts of the expansion as $$\exp\left(\tau \frac{z - z^{-1}}{2}\right) = \underbrace{\sum_{k \in 2\mathbb{Z}} J_k(\tau) \frac{z^k + z^{-k}}{2}}_{A(z)} + i \underbrace{\sum_{k \in 2\mathbb{Z}+1} J_k(\tau) \frac{z^k - z^{-k}}{2i}}_{B(z)}. \quad (33)$$

This expansion, called the Jacobi-Anger expansion, converges absolutely at a superexponential rate, as shown below by a steepest descent method.

Lemma 6. For any real number $\tau$ and any integer $k \neq 0$, $$|J_k(\tau)| \leq \frac{e}{2}\left(\frac{e|\tau|}{2(|k|+1)}\right)^{|k|}. \quad (34)$$

Proof. It suffices to consider the case where $\tau \geq 0$ and $k \geq 1$.

$$J_k(\tau) = \frac{1}{2\pi}\int_0^{2\pi} d\varphi\, e^{i\tau \sin\varphi} e^{-ik\varphi} = \frac{1}{2\pi i}\int_\Gamma \frac{dz}{z} e^{(\tau/2)(z - z^{-1})} z^{-k} \quad (35)$$

where the contour $\Gamma$ is the unit circle. Since the integrand has a pole only at $z = 0$ and it vanishes on large z with $\Re(z) < r$ for any fixed $r < \infty$, the contour may be replaced with a semi-circle with an infinite negative real together with a line $z(y) = (2(k+1)/\tau) + iy$ where $y \in \mathbb{R}$. The contribution from the semi-circle at infinity is zero. Therefore, $$|J_k(\tau)| < \frac{1}{2\pi}\int_{-\infty}^{\infty} dy \frac{e^{k+1}}{|2(k+1)/\tau + iy|^{k+1}}$$

$$= \frac{e}{2\pi}\left(\frac{e\tau}{2(k+1)}\right)^k \int_{-\infty}^{\infty} \frac{dy}{(1+y^2)^{(k+1)/2}}$$

$$\leq \frac{e}{2\pi}\left(\frac{e\tau}{2(k+1)}\right)^k \int_{-\infty}^{\infty} \frac{dy}{1+y^2}$$

$$= \frac{e}{2}\left(\frac{e\tau}{2(k+1)}\right)^k.$$

One can improve the second inequality by evaluating the integral explicitly, to give an extra factor of $\mathcal{O}(k^{-1/2})$ in the bound.

A partial sum of the Jacobi-Anger expansion can be written as $$\sum_{k:|k|\le n} J_k(\tau)z^k = \underbrace{\sum_{\text{even } k: 0\le k\le n} J_k(\tau)\frac{z^k+z^{-k}}{2}}_{\tilde{A}(z)} + i\underbrace{\sum_{\text{odd } k: 0\le k\le n} J_k(\tau)\frac{z^k-z^{-k}}{2i}}_{\tilde{B}(z)}. \quad (36)$$

This is $\epsilon$-close to the full expansion if $n=\Omega(\tau+\log(1/\epsilon))$ by Lemma 6 for any $z\in U(1)$. Numerical experiments suggest that the bound is quite tight and it suffices to choose $$n \approx \frac{e}{2}\tau + \ln(1/\epsilon) \approx 1.36\tau + 2.30\log_{10}(1/\epsilon). \quad (37)$$

The Laurent polynomials $\tilde{A}(z)$ and $\tilde{B}(z)$ are pure real-on-circle. Applying the example algorithm, one obtains real-on-circle Laurent polynomials $a(z)=a_+(z)$, $b(z)=ib_-(z)$, $c(z)=ic_-(z)$, $d(z)=d_+(z)$. The pure Laurent polynomials $c(z)$, $d(z)$ are calculated by Lemma 4 where one chooses $c(z)$ to be anti-reciprocal and $d(z)$ reciprocal. (This choice is to have the results in the same convention as those of Guang Hao Low, Theodore J. Yoder. and Isaac L. Chuang, "Methodology of resonant equiangular composite quantum gates," Phys. Rev. X 6, 041067 (2016), 1603.03996.) Note that every exponent of z of the polynomial $1-a(z)^2-b(z)^2$ here, whose roots must be computed, is even since $a(z)$ has only even exponents and $b(z)$ has only odd exponents, so it is always better to feed a Laurent polynomial g of degree n, instead of 2n, where $$g(z^2) = 1 - a(z)^2 - b(z)^2 \quad (38)$$

into the root finding routine. Given the expanded form of $1-a(z)^2-b(z)^2$, it takes no effort to find g. In this case, the intermediate polynomial $c(z)$ of Lemma 4 is $$e(z) = \prod_{r\in\mathbb{R}\,:\,g(r)=0,\,|r|>1}\left(z-\frac{r}{z}\right)\prod_{c\in\mathbb{C}\,:\,g(c)=0,\,|c|>1,\,\text{Im}(c)>0}\left(z^2-(c+\bar{c})+\frac{c\bar{c}}{z^2}\right). \quad (39)$$

VI. Application to Matrix Inversion

While there are slightly more efficient implementations of matrix inversion problems (see, e.g., A. W. Harrow, A. Hassidim, and S. Lloyd, Quantum algorithm for solving linear systems of equations, Physical Review Letters 15, 150502 (2009)) using quantum signal processing, here the eigenvalue transformation perspective is considered. i Suppose a hermnitian matrix H of norm at most 1 that one wishes to invert is block-encoded in a unitary W so that W has eigenvalues $\mp e^{\pm i\Theta_\lambda}$ associated with an eigenvalue A of H. This encoding is the same as in the Hamiltonian simulation above. The condition for H being hermitian is not too restrictive since, for any matrix M, an enlarged matrix $|0\rangle\rangle 1|\otimes M + |1\rangle\langle 0|\otimes M^\dagger$ is always hermitian. Then, one wants an eigenvalue transformation $\mp e^{\pm i\Theta_\lambda} \to 1/\sin\theta_\lambda$. As one should not invert a singular matrix, one can assume that eigenvalues of H are bounded away from zero by $1/\kappa$ where $\kappa\ge 1$ is the condition number of H. (Strictly zero eigenvalues are fine if one is interested in a pseudo-inverse.) Thanks to the condition number assumption, one desirably finds a polynomial approximation to the function $\mp e^{i\Theta_\lambda} \to 1/\sin\theta_\lambda$ that is good for values $\sin\theta_\lambda$ away from zero by $1/\kappa$. For this purpose, there is a useful polynomial (see A. M. Childs, R. Kothari, and R. D. Somma, "Quantum algorithm for systems of linear equations with exponentially improved dependence on precision." SIAM Journal on Computing 46, 1920 1950 (2017)).

Lemma 7. Let $b\ge b'\ge 1$ be any integers, and let $z=e^{i\varphi}\in U(1)$ be any complex number. Then.

$$\left|\left(\frac{z+z^{-1}}{2}\right)^{2b} - \frac{1}{2^{2b}}\sum_{k=-b'}^{b'}\binom{2b}{b+k}z^{2k}\right| \le 2e^{-b'^2/b}. \quad (40)$$

If $\left|\frac{z-z^{-1}}{2i}\right| = |\sin\varphi| \ge 1/\kappa$, then $$\left|\left(\frac{z+z^{-1}}{2}\right)^{2b}\right| \le e^{-b/\kappa^2}. \quad (41)$$

Proof. The first claim is proved as $$\left|2^{-2b}\sum_{k:|k|>b'}\binom{2b}{b+k}z^{2k}\right| \le 2^{-2b}\sum_{k:|k|>b'}\binom{2b}{b+k}$$

and then using Hoeffding's inequality on the tail of binomial probability distributions. The second claim is proved as $(1-\sin^2\varphi)^b \le e^{-b/\kappa^2}$ whenever $|\sin\varphi|\ge 1/\kappa$. □

Thus, for large b, one sees that $1-((z+z^{-1})/2)^{2b}$ vanishes when $\sin\varphi=0$ (i.e., $z=\pm 1$), but is close to 1 for $|\sin\varphi|\ge 1/\kappa$. By the first statement of the lemma this function can be replaced with a lower degree polynomial function. Quantitatively, with $z=e^{i\varphi}$ one has an $\epsilon$-approximation of the desired inversion function by Laurent polynomial of degree $2b'-1$ for $|\sin\varphi|\ge 1/\kappa$:

$$\frac{2i}{2^{2b}\kappa(z-z^{-1})}\sum_{k=-b'}^{b'}\binom{2b}{b+k}(1-z^{2k}) \approx \frac{2i}{\kappa(z-z^{-1})} \quad (42)$$

where $b=\kappa^2\log(2/\epsilon)$ and $b'=\sqrt{b\log(4/\epsilon)}=\mathcal{O}(\kappa\log(1/\epsilon))$. The left-hand side is a genuine Laurent polynomial since the sum vanishes at $z=\pm 1$. Feeding this polynomial, which is real-on-circle and anti-reciprocal, into the example algorithm, one obtains a desired eigenvalue inversion quantum algorithm. The success probability can be as small as $\Omega(1/\kappa^2)$, and hence one can better amplify the amplitude for post-selection, enlarging the quantum gate complexity by a factor of $\mathcal{O}(\kappa)$.

VII. Example Embodiments

Figure 5:
FIG. 5 is a flowchart showing an example embodiment for implementing an embodiment of the disclosed technology.

FIG. 5 is a flowchart 500 showing an example embodiment for implementing an embodiment of the disclosed technology. The particular operations and sequence of operations should not be construed as limiting, as they can be performed alone or in any combination, subcombination, and/or sequence with one another. Additionally, the illustrated operations can be performed together with one or more other operations. In particular, flowchart 500 illustrates a method for synthesizing a data-lookup oracle in accordance with the disclosed technology.

At 510, one or more unitary-valued functions are generated by a classical computer generating using projectors with a predetermined number of significant bits.

At 512, a quantum computing device is configured to implement the one or more unitary-valued functions.

In some implementations, the unitary-valued functions are iteratively decomposed.

In further implementations, the unitary-valued functions are applied to implement a Hamiltonian simulation. In certain implementations, the unitary-valued functions are applied to solve a linear equation.

FIG. 6 is a flowchart 600 showing an example embodiment for implementing an embodiment of the disclosed technology. The particular operations and sequence of operations should not be construed as limiting, as they can be performed alone or in any combination, subcombination, and/or sequence with one another. Additionally, the illustrated operations can be performed together with one or more other operations. In particular, flowchart 600 illustrates a method for synthesizing a data-lookup oracle in accordance with the disclosed technology.

At 610, a quantum circuit description for implementing quantum signal processing that decomposes complex-valued periodic functions is generated by a classical computer, wherein the generating further includes representing approximate polynomials in a Fourier series with rational coefficients.

At 612, a quantum computing device is configured to implement a quantum circuit defined by the quantum circuit description.

In some implementations, the Fourier series with rational coefficients decreases numerical instability in the computation of decomposition. In further implementations, the quantum circuit description is configured to perform a Hamiltonian simulation. In certain implementations, the quantum circuit description is configured to solve a linear equation.

FIG. 7 is a flowchart 700 showing an example embodiment for implementing an embodiment of the disclosed technology. The particular operations and sequence of operations should not be construed as limiting, as they can be performed alone or in any combination, subcombination, and/or sequence with one another. Additionally, the illustrated operations can be performed together with one or more other operations. In particular, flowchart 700 illustrates a method for synthesizing a data-lookup oracle in accordance with the disclosed technology.

At 710, a quantum circuit description for implementing quantum signal processing that decomposes complex-valued periodic functions is generated by a classical computer, wherein the generating further includes truncating terms in approximation polynomials with coefficients determined by a preset accuracy parameter.

At 712, a quantum computing device is configured to implement a quantum circuit defined by the quantum circuit description.

In some implementations, the truncating decreases numerical instability in the computation of decomposition. In further implementations, the quantum circuit description is configured to perform a Hamiltonian simulation. In certain implementations, the quantum circuit description is configured solve a linear equation.

FIG. 8 is a flowchart 800 showing an example embodiment for implementing an embodiment of the disclosed technology. The particular operations and sequence of operations should not be construed as limiting, as they can be performed alone or in any combination, subcombination, and/or sequence with one another. Additionally, the illustrated operations can be performed together with one or more other operations. In particular, flowchart 800 illustrates a method for synthesizing a data-lookup oracle in accordance with the disclosed technology.

At 810, a quantum circuit description is generated, by a classical computer, for implementing quantum signal processing that decomposes complex-valued periodic functions, wherein the generating further includes expanding factorized polynomial using discrete fast Fourier transforms.

At 812, a quantum computing device is configured to implement a quantum circuit defined by the quantum circuit description.

In some implementations, the expanding decreases numerical instability in the computation of decomposition. In certain implementations, the quantum circuit description is configured to perform a Hamiltonian simulation. In further implementations, the quantum circuit description is configured solve a linear equation.

FIG. 9 is a flowchart 900 showing an example embodiment for implementing an embodiment of the disclosed technology. The particular operations and sequence of operations should not be construed as limiting, as they can be performed alone or in any combination, subcombination, and/or sequence with one another. Additionally, the illustrated operations can be performed together with one or more other operations. In particular, flowchart 900 illustrates a method for synthesizing a data-lookup oracle in accordance with the disclosed technology.

At 910, a quantum circuit description for implementing quantum signal processing that decomposes complex-valued periodic functions is generated by a classical computer, wherein the generating further includes determining complementary polynomials by finding roots of Laurent polynomials to a preset accuracy.

At 912, a quantum computing device is configured to implement a quantum circuit defined by the quantum circuit description.

In some implementations, the quantum circuit description is configured to perform a Hamiltonian simulation. In certain implementations, the quantum circuit description is configured solve a linear equation.

VIII. Example Computing Environments

FIG. 1 illustrates a generalized example of a suitable classical computing environment 100 in which several of the described embodiments can be implemented. The computing environment 100 is not intended to suggest any limitation as to the scope of use or functionality of the disclosed technology, as the techniques and tools described herein can be implemented in diverse general-purpose or special-purpose environments that have computing hardware.

With reference to FIG. 1, the computing environment 100 includes at least one processing device 110 and memory 120. In FIG. 1, this most basic configuration 130 is included within a dashed line. The processing device 110 (e.g., a CPU or microprocessor) executes computer-executable instructions. In a multi-processing system, multiple processing devices execute computer-executable instructions to increase processing power. The memory 120 may be volatile memory (e.g., registers, cache, RAM, DRAM, SRAM), non-volatile memory (e.g., ROM, EEPROM, flash memory), or some combination of the two. The memory 120 stores software 180 implementing tools for performing any of the quantum signal processing techniques having numerical error controls as described herein. The memory 120 can also store software 180 for performing any of the quantum signal processing techniques with numerical error controls as described herein, as well as software 180 for synthesizing, generating, or compiling quantum circuits resulting from the results of the quantum signal processing techniques.

The computing environment can have additional features. For example, the computing environment 100 includes storage 140, one or more input devices 150, one or more output devices 160, and one or more communication connections 170. An interconnection mechanism (not shown), such as a bus, controller, or network, interconnects the components of the computing environment 100. Typically, operating system software (not shown) provides an operating environment for other software executing in the computing environment 100, and coordinates activities of the components of the computing environment 100.

The storage 140 can be removable or non-removable, and includes one or more magnetic disks (e.g., hard drives), solid state drives (e.g., flash drives), magnetic tapes or cassettes, CD-ROMs, DVDs, or any other tangible non-volatile storage medium which can be used to store information and which can be accessed within the computing environment 100.

The storage 140 can also store instructions for the software 180 implementing any of the disclosed quantum signal processing techniques having numerical error controls. The storage 1-10 can also store instructions for the software 180 for generating and/or synthesizing any of the described techniques, systems, or reversible circuits.

The input device(s) 150 can be a touch input device such as a keyboard, touchscreen, mouse, pen, trackball, a voice input device, a scanning device, or another device that provides input to the computing environment 100. The output device(s) 160 can be a display device (e.g., a computer monitor, laptop display, smartphone display, tablet display, netbook display, or touchscreen), printer, speaker, or another device that provides output from the computing environment 100.

The communication connection(s) 170 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods, quantum signal processing techniques having numerical error controls, circuit design techniques, or compilation/synthesis techniques can be described in the general context of computer-readable instructions stored on one or more computer-readable media. Computer-readable media are any available media (e.g., memory or storage device) that can be accessed within or by a computing environment. Computer-readable media include tangible computer-readable memory or storage devices, such as memory 120 and/or storage 140, and do not include propagating carrier waves or signals per se (tangible computer-readable memory or storage devices do not include propagating carrier waves or signals per se).

Various embodiments of the methods disclosed herein can also be described in the general context of computer-executable instructions (such as those included in program modules) being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

Figure 2:
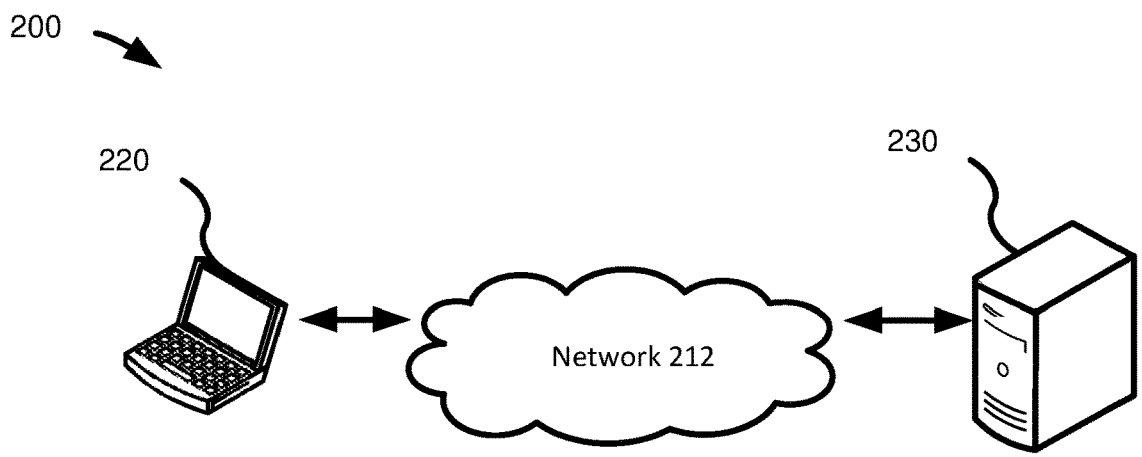
FIG. 2 is an example of a client-server network for implementing a system according to the disclosed technology.

An example of a possible network topology 200 (e.g., a client-server network) for implementing a system according to the disclosed technology is depicted in FIG. 2. Networked computing device 220 can be, for example, a computer running a browser or other software connected to a network 212. The computing device 220 can have a computer architecture as shown in FIG. 2 and discussed above. The computing device 220 is not limited to a traditional personal computer but can comprise other computing hardware configured to connect to and communicate with a network 212 (e.g., smart phones, laptop computers, tablet computers, or other mobile computing devices, servers, network devices, dedicated devices, and the like). Further, the computing device 220 can comprise an FPGA or other programmable logic device. In the illustrated embodiment, the computing device 220 is configured to communicate with a computing device 230 (e.g., a remote server, such as a server in a cloud computing environment) via a network 212. In the illustrated embodiment, the computing device 220 is configured to transmit input data to the computing device 230, and the computing device 230 is configured to implement any of the quantum signal processing techniques having numerical error controls as disclosed herein and/or circuit generation or compilation/synthesis methods for generating quantum circuits based on or in conjunction with the quantum signal processing techniques disclosed herein. The computing device 230 can output results to the computing device 220. Any of the data received from the computing device 230 can be stored or displayed on the computing device 220 (e.g., displayed as data on a graphical user interface or web page at the computing devices 220). In the illustrated embodiment, the illustrated network 212 can be implemented as a Local Area Network (LAN) using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the network 212 can be the Internet or a similar public network and operate using an appropriate protocol (e.g., the HTTP protocol).

Figure 3:
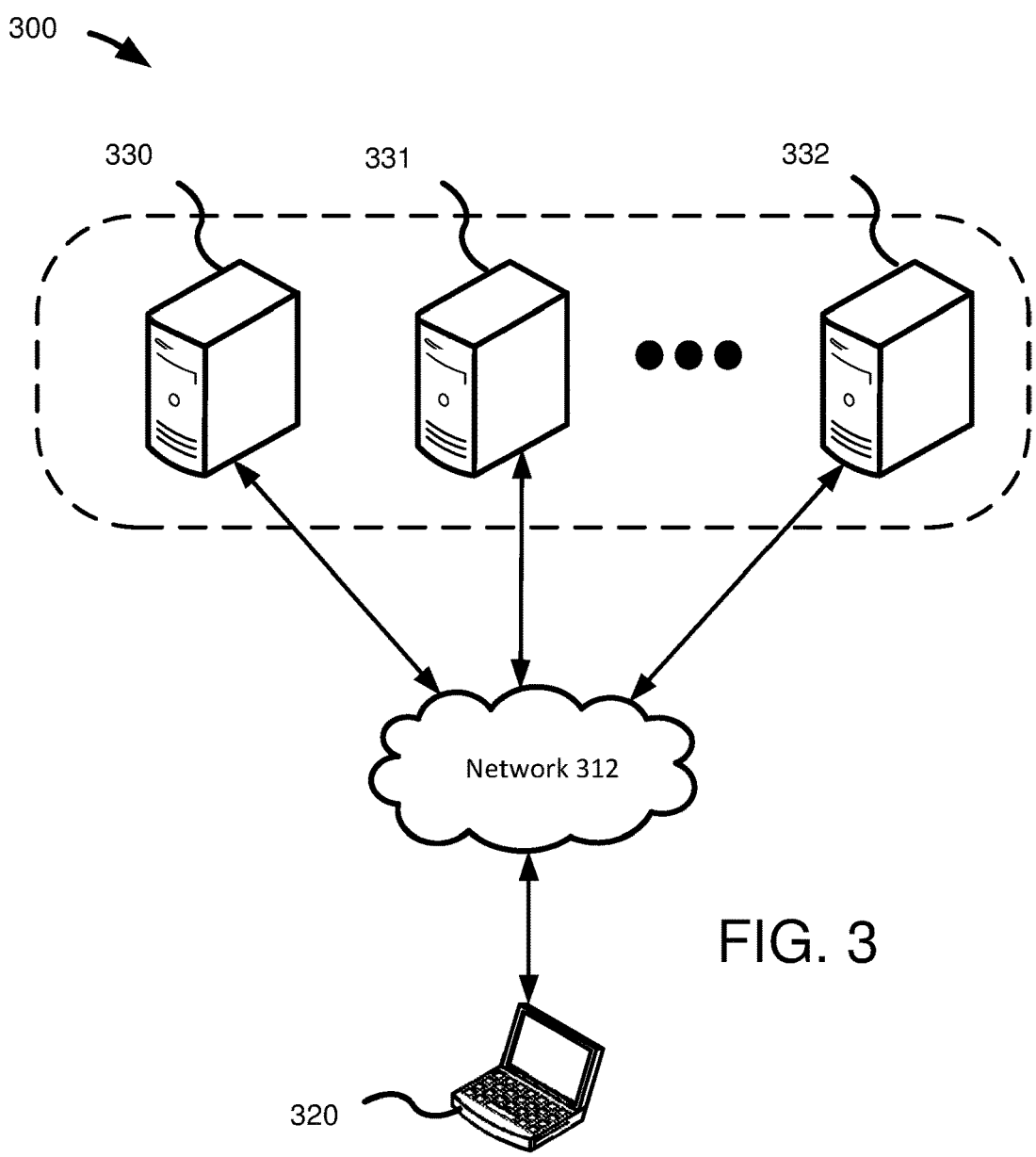
FIG. 3 is an example of a distributed computing environment for implementing a system according to the disclosed technology.

Another example of a possible network topology 300 (e.g., a distributed computing environment) for implementing a system according to the disclosed technology is depicted in FIG. 3. Networked computing device 320 can be, for example, a computer running a browser or other software connected to a network 312. The computing device 320 can have a computer architecture as shown in FIG. 1 and discussed above. In the illustrated embodiment, the computing device 320 is configured to communicate with multiple computing devices 330, 331, 332 (e.g., remote servers or other distributed computing devices, such as one or more servers in a cloud computing environment) via the network 312. In the illustrated embodiment, each of the computing devices 330, 331, 332 in the computing environment 300 is used to perform at least a portion of a quantum signal processing technique having numerical error controls (as disclosed herein) and/or a synthesis/compilation process. In other words, the computing devices 330, 331, 332 form a distributed computing environment in which the quantum signal processing techniques having numerical error controls (as disclosed herein) and/or generation/compilation/ synthesis processes are shared across multiple computing devices. The computing device 320 is configured to transmit input data to the computing devices 330, 331, 332, which are configured to distributively implement such as process, including performance of any of the disclosed methods or creation of any of the disclosed circuits, and to provide results to the computing device 320. Any of the data received from the computing devices 330, 331, 332 can be stored or displayed on the computing device 320 (e.g., displayed as data on a graphical user interface or web page at the computing devices 320). The illustrated network 312 can be any of the networks discussed above with respect to FIG. 2.

Figure 4:
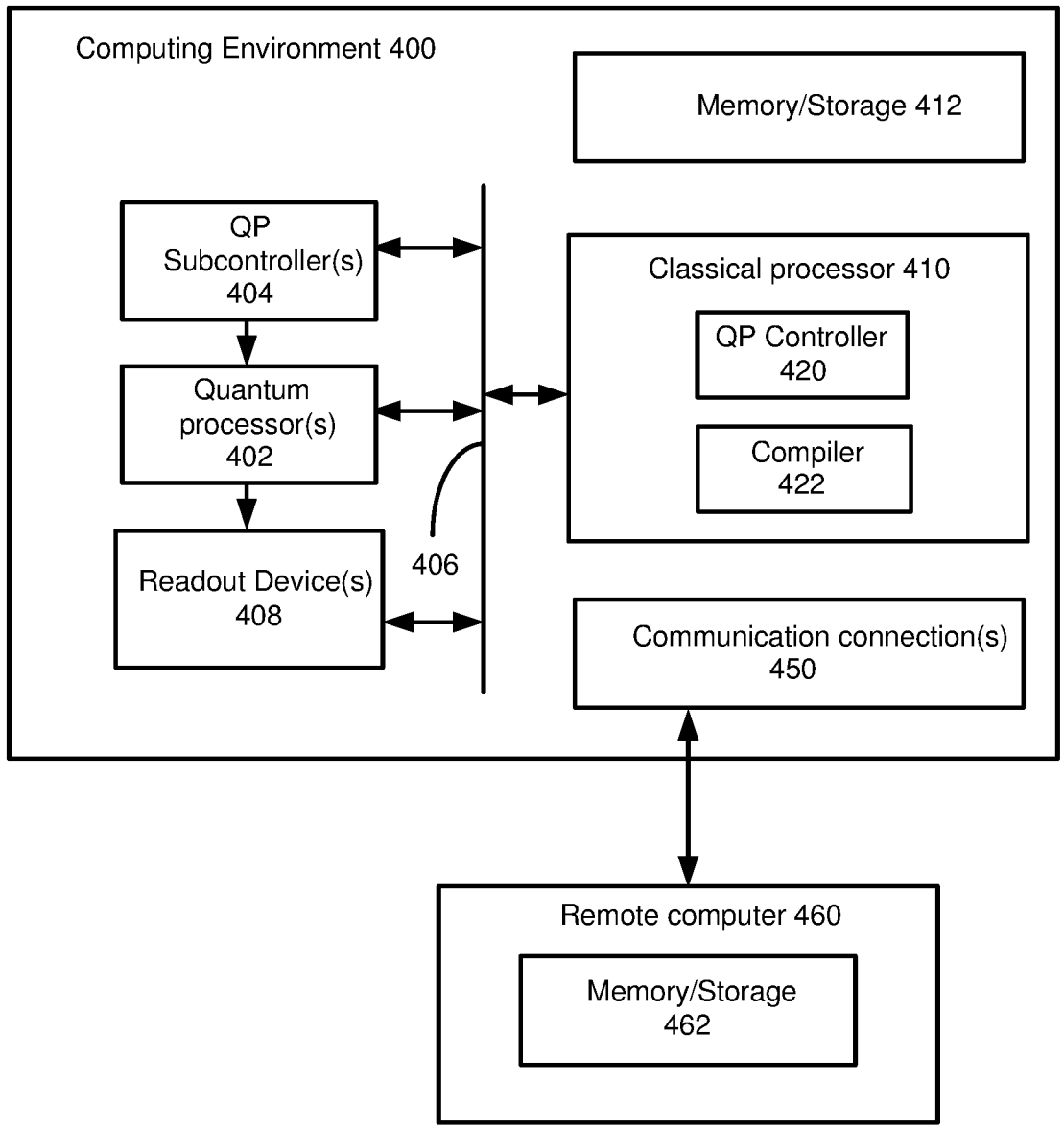
FIG. 4 is an exemplary system for implementing embodiments of the disclosed technology.

With reference to FIG. 4, an exemplary system for implementing the disclosed technology includes computing environment 400. In computing environment 400, a compiled quantum computer circuit description (including quantum circuits resulting from and/or supported by any of the quantum signal processing techniques having numerical error control(s) as disclosed herein) can be used to program (or configure) one or more quantum processing units such that the quantum processing unit(s) implement the circuit described by the quantum computer circuit description.

The environment 400 includes one or more quantum processing units 402 and one or more readout device(s) 408. The quantum processing unit(s) execute quantum circuits that are precompiled and described by the quantum computer circuit description. The quantum processing unit(s) can be one or more of, but are not limited to: (a) a superconducting quantum computer; (b) an ion trap quantum computer; (c) a fault-tolerant architecture for quantum computing; and/or (d) a topological quantum architecture (e.g., a topological quantum computing device using Majorana zero modes). The precompiled quantum circuits (including any circuit resulting from and/or supported by any of the quantum signal processing techniques having numerical error control(s) as disclosed herein) can be sent into (or otherwise applied to) the quantum processing unit(s) via control lines 406 at the control of quantum processor controller 420. The quantum processor controller (QP controller) 420 can operate in conjunction with a classical processor 410 (e.g., having an architecture as described above with respect to FIG. 1) to implement the desired quantum computing process. In the illustrated example, the QP controller 420 further implements the desired quantum computing process via one or more QP subcontrollers 404 that are specially adapted to control a corresponding one of the quantum processor(s) 402. For instance, in one example, the quantum controller 420 facilitates implementation of the compiled quantum circuit by sending instructions to one or more memories (e.g., lower-temperature memories), which then pass the instructions to low-temperature control unit(s) (e.g., QP subcontroller(s) 404) that transmit, for instance, pulse sequences representing the gates to the quantum processing unit(s) 402 for implementation. In other examples, the QP controller(s) 420 and QP subcontroller(s) 404 operate to provide appropriate magnetic fields, encoded operations, or other such control signals to the quantum processor(s) to implement the operations of the compiled quantum computer circuit description. The quantum controller(s) can further interact with readout devices 408 to help control and implement the desired quantum computing process (e.g., by reading or measuring out data results from the quantum processing units once available, etc.)

With reference to FIG. 4, compilation is the process of translating a high-level description of a quantum algorithm into a quantum computer circuit description comprising a sequence of quantum operations or gates, which can include the circuits as disclosed herein. The compilation can be performed by a compiler 422 using a classical processor 410 (e.g., as shown in FIG. 1) of the environment 400 which loads the high-level description from memory or storage devices 412 and stores the resulting quantum computer circuit description in the memory or storage devices 412.

In other embodiments, compilation and/or quantum program simulation can be performed remotely by a remote computer 460 (e.g., a computer having a computing environment as described above with respect to FIG. 1) which stores the resulting quantum computer circuit description in one or more memory or storage devices 462 and transmits the quantum computer circuit description to the computing environment 400 for implementation in the quantum processing unit(s) 402. For instance, with reference to FIG. 4, remote computer 460 includes a quantum program simulator 464 that can be perform any of the simulation techniques disclosed herein. Still further, the remote computer 400 can store the high-level description in the memory or storage devices 462 and transmit the high-level description to the computing environment 400 for compilation and use with the quantum processor(s).

In any of these scenarios. results from the computation performed by the quantum processor(s) can be communicated to the remote computer after and/or during the computation process. Still further, the remote computer can communicate with the QP controller(s) 420 such that the quantum computing process (including any compilation, simulation, and QP control procedures) can be remotely controlled by the remote computer 460. In general, the remote computer 460 communicates with the QP controller(s) 420, compiler/synthesizer 422, quantum program simulator 421. via communication connections 450.

In particular embodiments, the environment 400 can be a cloud computing environment, which provides the quantum processing resources of the environment 400 to one or more remote computers (such as remote computer 460) over a suitable network (which can include the internet).

IX. Appendix: Jordan's Lemma and Block Encoding of Hamiltonians

Lemma 8. Let P and Q be arbitrary self-adjoint projectors on a finite dimensional complex vector space V. Then, V decomposes into orthogonal subspaces $V_j$ invariant under P and Q, where each $V_j$ has dimension 1 or 2.

For any hermitian operator H, let supp(H) denote the subspace support of H (the orthogonal complement of the kernel of H). Clearly, supp(H) is an invariant subspace of H, and H is invertible within supp(H).

Proof. Here, a subspace W of dimension at most 2 is found that is invariant under both P and Q. This is sufficient since the orthogonal complement of W is also invariant and the proof will be completed by induction in the dimension of V.

Put P'=I−P and Q'=I−Q, and consider the identities $$PQP+PQ'P+P'QP'+P'Q'P'=I, \qquad (43)$$

$$\mathrm{supp}(PQP)+\mathrm{supp}(PQ'P)+\mathrm{supp}(P'QP')+\mathrm{supp}(P'Q'P')=V, \qquad (44)$$

where the second equality is because the intersection of the orthogonal complements of the four supports is zero. Therefore, at least one of four supports is nonzero, and without loss of generality assume S=supp(PQP)≠0. Let $|\psi\rangle \in S$ be an eigenvector of PQP; PQP$|\psi\rangle$=a$|\psi\rangle$. The associated eigenvalue a is nonzero by definition of S. Now consider $W=\text{span}\{|\psi\rangle, Q|\psi\rangle\}$. Observe that $a|\psi\rangle=PQP|\psi\rangle=PPQP|\psi\rangle=aP|\psi\rangle$, and hence $P|\psi\rangle=|\psi\rangle$. Moreover, $PQ|\psi\rangle=PQP|\psi\rangle=a|\psi\rangle$. Therefore, W is a nonzero invariant subspace under both P and Q. □

This Jordan's lemma can be applied to two hermitian unitaries (reflections) $U_1$, $U_2$ as any hermitian unitary is $2P-I$ for some projector P. It immediately follows that there is a basis where $U_1$ is diagonal and $U_1U_2$ is block-diagonal with at most two-dimensional blocks and each block belongs to U(1) or U(2). In any such two-dimensional block, one has $$U_1 = \begin{pmatrix} 1 & 0 \\ 0 & -1 \end{pmatrix}, U_2 = \begin{pmatrix} \lambda & e^{i\phi}\sqrt{1-\lambda^2} \\ e^{-i\phi}\sqrt{1-\lambda^2} & -\lambda \end{pmatrix} \quad (45)$$

for some real number $\lambda \in [-1, 1]$ and an angle $\phi \in \mathbb{R}$, up to a permutation of rows and columns. Therefore, the product $W=-iU_1U_2$ is a rotation in a two-dimensional subspace that appears in Grover search algorithm (see L. K. Grover, "A fast quantum mechanical algorithm for database search," in Proceedings, 28th Annual ACM Symposium on the Theory of Computing (STOC) (1996) pp. 212 219) and has eigenvalues $\pm e^{\pm i\theta}$ where $\sin \theta = \lambda$. This is relevant in a Hamiltonian simulation problem where $U_1=2|G\rangle\langle G|-1$ and the Hamiltonian is "block-encoded" as $H=\langle G|U_2|G\rangle$, which is the case if H is represented as, e.g., a linear combination of Pauli operators.

X. Concluding Remarks

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

What is claimed is:

1. A method, comprising:
by a classical computer, generating one or more unitary-valued functions using projectors with a predetermined number of significant bits; and
configuring a quantum computing device to implement the one or more unitary-valued functions.

2. The method of claim 1, wherein the unitary-valued functions are iteratively decomposed.

3. A system, comprising:
a quantum computing device; and
a classical computing device in communication with the quantum computing device and adapted to perform the method of claim 1.

4. A method, comprising:
by a classical computer, generating one or more unitary-valued functions using projectors with a predetermined number of significant bits; and
configuring a quantum computing device to implement the one or more unitary-valued functions, wherein the unitary-valued functions are applied to implement a Hamiltonian simulation.

5. A method, comprising:
by a classical computer, generating one or more unitary-valued functions using projectors with a predetermined number of significant bits; and
configuring a quantum computing device to implement the one or more unitary-valued functions, wherein the unitary-valued functions are applied to solve a linear equation.

6. A method, comprising:
by a classical computer, generating a quantum circuit description for implementing quantum signal processing that decomposes complex-valued periodic functions, wherein the generating further includes representing approximate polynomials in a Fourier series with rational coefficients; and
configuring a quantum computing device to implement a quantum circuit defined by the quantum circuit description.

7. The method of claim 6, wherein the Fourier series with rational coefficients decreases numerical instability in the computation of decomposition.

8. The method of claim 6, wherein the quantum circuit description is configured to perform a Hamiltonian simulation.

9. The method of claim 6, wherein the quantum circuit description is configured to solve a linear equation.

10. A method, comprising:
by a classical computer, generating a quantum circuit description for implementing quantum signal processing that decomposes complex-valued periodic functions, wherein the generating further includes truncating terms in approximation polynomials with coefficients determined by a preset accuracy parameter; and
configuring a quantum computing device to implement a quantum circuit defined by the quantum circuit description.

11. The method of claim 10, wherein the truncating decreases numerical instability in the computation of decomposition.

12. The method of claim 10, wherein the quantum circuit description is configured to perform a Hamiltonian simulation.

13. The method of claim 10, wherein the quantum circuit description is configured to solve a linear equation.

14. A method, comprising:
by a classical computer, generating a quantum circuit description for implementing quantum signal processing that decomposes complex-valued periodic functions, wherein the generating further includes expanding factorized polynomial using discrete fast Fourier transforms; and
configuring a quantum computing device to implement a quantum circuit defined by the quantum circuit description.

15. The method of claim 14, wherein the expanding decreases numerical instability in the computation of decomposition.

16. The method of claim 14, wherein the quantum circuit description is configured to perform a Hamiltonian simulation.

17. The method of claim 14, wherein the quantum circuit description is configured solve a linear equation.

18. A method, comprising:
by a classical computer, generating a quantum circuit description for implementing quantum signal processing that decomposes complex-valued periodic functions, wherein the generating further includes determining complementary polynomials by finding roots of Laurent polynomials to a preset accuracy; and
configuring a quantum computing device to implement a quantum circuit defined by the quantum circuit description.

19. The method of claim 18, wherein the quantum circuit description is configured to perform a Hamiltonian simulation.

20. The method of claim 18, wherein the quantum circuit description is configured solve a linear equation.

* * * * *